Sept. 29, 1959     ZENJI WAKIMOTO     2,906,174
PHOTOGRAPHIC OBJECTIVE
Filed July 31, 1957
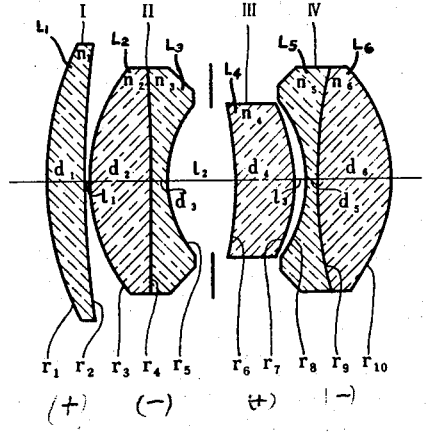
INVENTOR.
ZENJI WAKIMOTO

United States Patent Office 2,906,174
Patented Sept. 29, 1959

2,906,174

PHOTOGRAPHIC OBJECTIVE

Zenji Wakimoto, Tokyo, Japan, assignor to Nippon Kogaku K.K., Tokyo, Japan, a corporation of Japan Application July 31, 1957, Serial No. 675,357

1 Claim. (Cl. 88—57)

The present invention relates to a photographic objective and more particularly to a photographic objective having a high degree of perfection in the correction of various aberrations.

A photographic objective of a relatively wide aperture generally suffers from the built-in defect of aberration to a critical extent in the edge region of the picture in comparison with that produced in the main central region thereof. While in a wide angle objective a uniform and stabilized aberration is produced relative to the edge region of the picture, it is impossible to have adequate brilliancy of the picture because of the relatively narrow aperture of the objective.

In order to obtain particularly precise and sharp pictures, it is necessary to use objectives with high correction of the various aberrations throughout the requisite whole area of the picture. And in another aspect, in view of the diffraction phenomena as well as the photographic conditions and the like, a relatively wide aperture objective is required.

It is an object of the present invention to provide a photographic objective of a new and novel structure and performance to satisfy the aforesaid dual conditions.

A clearer concept of the scope and purpose of the present invention may be obtained from the following description, taken in connection with the attached drawing in which an illustrative practical embodiment of the present invention is shown.

Referring to the sole figure of the drawing, the photographic objective according to the present invention comprises a pair of front components, I and II, of the Gauss type objective lenses, and a pair of rear components, III and IV, of a wide angle type objective lenses, having a diaphragm therebetween. In accordance with the usual convention, the radii of curvature of the lenses are designated in the drawing by $r_{subscript}$, the optical axis thickness of the lens elements by $d_{subscript}$, the air spaces between lenses by $l_{subscript}$, and the refractive indices of the material of the lenses by $n_{subscript}$, each series of subscripts being in the increasing order from the front to the back of the objective of the item thereby designated. Each of the components I, II, III and IV is a meniscus shaped lens with its concave surface toward the diaphragm. The first component I and the third component III, are each single lenses, $L_1$ and $L_3$, respectively, having a convex converging power. The second component II and the fourth component IV are each cemented doublets consisting of a convex lens and a concave lens, $L_2$, $L_3$, and $L_5$, $L_6$, respectively. The air space between components I and II is of concave meniscus shape with a convergent function, while the air space between components III and IV is of convex meniscus shape with a divergent function. It should be recalled that in a symmetrical disposition of lenses relative to a diaphragm, the front component and the rear component have almost equal function in correcting aberrations. On the contrary, however, the objective lens array of the present invention comprises the front component and the rear component aligned and positioned in unsymmetrical arrangement and each element has a function of different nature. As a result thereof, the various aberrations can readily be corrected accordingly. The outer and inner surfaces of the convex meniscus lens of the third component III have the function of shifting the sagittal image field and the meridional image field in a separate manner so that the component has a remarkable characteristic in correcting curvature of image as well as astigmatic aberration.

All things considered, the objective according to the present invention has the dual characteristics of the wide aperture of Gauss type objective and of the wide angle objective alike.

The following data is that of a practical embodiment of the objective according to the present invention comprising six lens elements, $L_1$ to $L_6$, arranged as four components, I to IV, in which the radii of curvature of the lens surfaces are denoted by reference symbols in the order of the alignment $r_1$, $r_2$ ... $r_{10}$, the axial thickness of each lens element at its center is denoted by reference symbols in the order of the alignment $d_1$, $d_2$ ... $d_6$, the axial distance of the air spaces between adjacent surfaces at the axial center is denoted by reference symbol in the order of the alignment $l_1$, $l_2$ and $l_3$, the refractive index on the spectrum $d$-line of each lens element is denoted by reference symbols in the order of the alignment $n_1$, $n_2$, ... $n_6$, and the Abbe number on the spectrum $d$-line of each lens element is denoted in the order of the alignment by reference symbols $v_1$, $v_2$, ... $v_6$:

[$f=100.0$  F/2.5]

| Component | Lens | Radius | Axial thickness and air spacing | Refractive index | Abbe number |
|---|---|---|---|---|---|
| I | $L_1$ | $r_1 =+\ 59.35$ | $d_1=\ 7.46$ | $n_1=1.61720$ | $V_1=54.0$ |
|   |      | $r_2 =+203.70$ | $l_1=\ 0.58$ |   |   |
|   | $L_2$ | $r_3 =+\ 34.69$ | $d_2=12.10$ | $n_2=1.62280$ | $V_2=56.9$ |
| II | $L_3$ | $r_4 =-889.55$ | $d_3=\ 3.60$ | $n_3=1.62045$ | $V_3=38.0$ |
|   |      | $r_5 =+\ 22.85$ | $l_2=12.89$ |   |   |
|   |      | $r_6 =-\ 70.74$ |   |   |   |
| III | $L_4$ | $r_7 =-\ 32.52$ | $d_4=11.53$ | $n_4=1.62041$ | $V_4=60.3$ |
|   |      | $r_8 =-\ 22.91$ | $l_3=\ 2.33$ |   |   |
| IV | $L_5$ | $r_9 =+110.27$ | $d_5=\ 2.71$ | $n_5=1.54869$ | $V_5=45.4$ |
|   | $L_6$ | $r_{10}=-\ 33.22$ | $d_6=14.25$ | $n_6=1.63854$ | $V_6=55.5$ |

As noted from the above description, the photographic objective of the present invention characteristically corrects coma in easy and ready manner because each element is aligned in an unsymmetrical arrangement therein, whereas, on the contrary and as is well known, correction for coma is most difficult in Gauss type objectives. Furthermore, the instant objective requires no particular glass of any specific nature, thus having the advantage of absorbing a lesser amount of the light beam of short-wave length through the glass. It is another advantage of the objective according to the present invention that a relatively sufficient amount of light beam through the edge region can be readily taken, since the elements of the front and rear components can be devised to have a larger size. When compared with generally-used-type objectives, of medium aperture, corrections of various aberrations can be made in an amazingly accurate manner even when taking into account the rather complicated structure of the objective according to the present invention.

What is claimed is:

A photographic objective comprising a first convex lens $L_1$, a doublet consisting of a second convex lens $L_2$ cemented to a first concave lens $L_3$, the doublet being air spaced from the first convex lens with the air space therebetween being of concave meniscus shape, a diaphragm, a third convex lens $L_4$, and a second doublet air spaced from the third convex lens and consisting of a second concave lens $L_5$ cemented to a fourth convex lens $L_6$, the air space between the third concex lens and the second doublet being of convex meniscus shape, the diaphragm being air spaced from the first doublet and the third convex lens, each the first convex lens, the third convex lens, the first doublet and the second doublet being concave facing the diaphragm, of which objective the magnitudes are substantially as follows:

[$f=100.0$   F/2.5]

| Component | Lens | Radius | Axial thickness and air spacing | Refractive index | Abbe number |
|---|---|---|---|---|---|
| I | $L_1$ | $r_1 =+ 59.35$ | $d_1 = 7.46$ | $n_1=1.61720$ | $V_1=54.0$ |
|  |  | $r_2 =+203.70$ | $l_1 = 0.58$ |  |  |
|  | $L_2$ | $r_3 =+ 34.69$ | $d_2 =12.10$ | $n_2=1.62280$ | $V_2=56.9$ |
| II | $L_3$ | $r_4 =-889.55$ | $d_3 = 3.60$ | $n_3=1.62045$ | $V_3=38.0$ |
|  |  | $r_5 =+ 22.85$ | $l_2 =12.89$ |  |  |
| III | $L_4$ | $r_6 =- 70.74$ | $d_4=11.53$ | $n_4=1.62041$ | $V_4=60.3$ |
|  |  | $r_7 =- 32.52$ | $l_3 = 2.33$ |  |  |
| IV | $L_5$ | $r_8 =- 22.91$ | $d_5= 2.71$ | $n_5=1.54869$ | $V_5=45.4$ |
|  | $L_6$ | $r_9 =+110.27$ | $d_6=14.25$ | $n_6=1.63854$ | $V_6=55.5$ |
|  |  | $r_{10}=- 33.22$ |  |  |  | where $r_{subscript}$ is the radius of curvature of the lens surface, $d_{subscript}$ the thickness of the lens element at the optical axis, $l_{subscript}$ the length of the air space between the lens surfaces, $n_{subscript}$ the refractive index of the material of the lens element, and $v_{subscript}$ the Abbe number thereof, each series of subscripts being in the increasing order of its position from the object to the image side of the objective.

References Cited in the file of this patent

UNITED STATES PATENTS

| | | |
|---|---|---|
| 1,168,873 | Florian | Jan. 18, 1916 |
| 2,649,023 | Tronnier | Aug. 18, 1953 |
| 2,672,788 | Brendel | Mar. 23, 1954 |
| 2,683,398 | Klemt et al. | July 13, 1954 |
| 2,748,656 | Berger et al. | June 5, 1956 |